(12) United States Patent
Patil et al.

(10) Patent No.: US 10,788,671 B2
(45) Date of Patent: Sep. 29, 2020

(54) ENHANCED VISION FOR FIREFIGHTER USING HEADS UP DISPLAY AND GESTURE SENSING

(71) Applicant: Honeywell International Inc., Morris Plains, NJ (US)

(72) Inventors: Swapnil Gopal Patil, Thane (IN); Rahul Ramesh Bhaskarwar, Hyderabad (IN); Nikhil B, Hyderabad (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/045,365

(22) Filed: Jul. 25, 2018

(65) Prior Publication Data

US 2019/0033594 A1    Jan. 31, 2019

(30) Foreign Application Priority Data

Jul. 26, 2017    (IN) .............................. 201711026558

(51) Int. Cl.
| | |
|---|---|
| *G02B 27/01* | (2006.01) |
| *A62B 18/08* | (2006.01) |
| *G06F 3/01* | (2006.01) |
| *H04N 5/33* | (2006.01) |

(52) U.S. Cl.
CPC .......... *G02B 27/0172* (2013.01); *A62B 18/08* (2013.01); *G02B 27/017* (2013.01); *G02B 27/0176* (2013.01); *G06F 3/017* (2013.01); *H04N 5/33* (2013.01); *G02B 2027/014* (2013.01); *G02B 2027/0138* (2013.01); *G02B 2027/0141* (2013.01)

(58) Field of Classification Search
CPC .................................................. G02B 27/0172
See application file for complete search history.

(56) References Cited

U.S. PATENT DOCUMENTS

| | | | |
|---|---|---|---|
| 2013/0088413 A1* | 4/2013 | Raffle | ............... G02B 27/0101 345/7 |
| 2013/0112195 A1 | 5/2013 | Smith | |
| 2015/0217145 A1 | 8/2015 | Teetzel | |
| 2017/0123211 A1 | 5/2017 | Lavoie | |

FOREIGN PATENT DOCUMENTS

| | | |
|---|---|---|
| EP | 3104257 A2 | 12/2016 |
| WO | 2017062709 A1 | 4/2017 |

OTHER PUBLICATIONS

Europe Patent Application No. 18185632.9, Extended European Search Report, dated Dec. 19, 2018, 8 pages.

* cited by examiner

*Primary Examiner* — Gustavo Polo
(74) *Attorney, Agent, or Firm* — Alston & Bird LLP

(57) ABSTRACT

Disclosed embodiments relate generally to improved mask displays (e.g. with thermal imaging) and/or control interfaces that may allow for hands-free operation of displays and/or devices. Specifically, such display and/or control systems may operate in the context of a mask, and may provide gesture-based control of display of information within the mask. Disclosed embodiments may comprise near-eye displays configured for gesture sensing of the wearer of the mask and/or for systems and/or methods of gesture-based control.

18 Claims, 3 Drawing Sheets

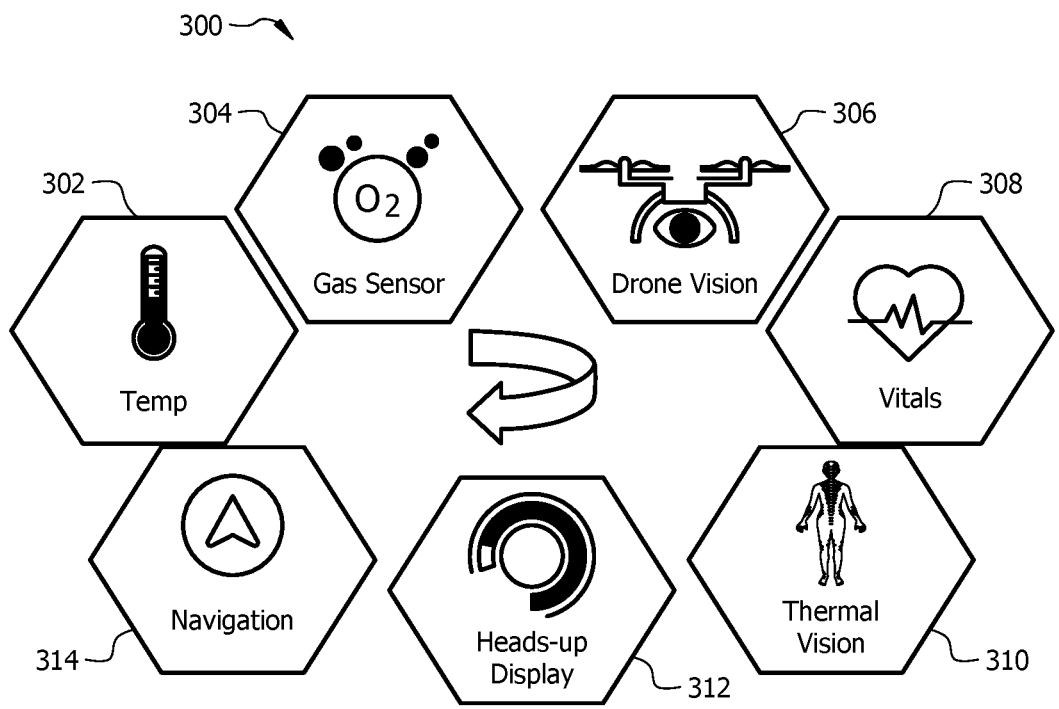
*FIG. 3A*
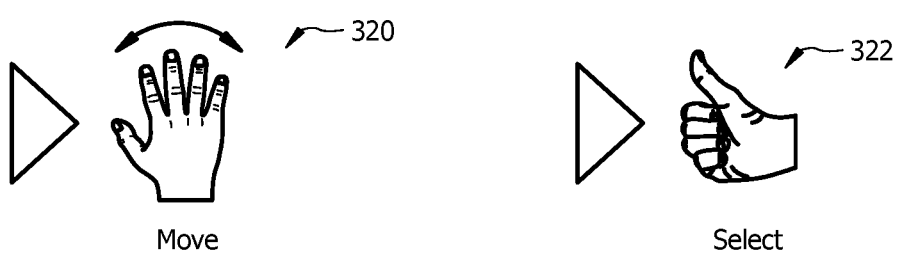
*FIG. 3B*  *FIG. 3C*

ENHANCED VISION FOR FIREFIGHTER USING HEADS UP DISPLAY AND GESTURE SENSING

CROSS-REFERENCE TO RELATED APPLICATIONS

The present application claims priority to India Provisional Patent Application Serial No. 201711026558 filed Jul. 26, 2017 by Swapnil Gopal Patil, et al. and entitled "Enhanced Vision for Firefighter Using Heads Up Display and Gesture Sensing" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

First Responders (such as firefighters) often wear masks, for example with SCBA, in hazardous environments. In such hazardous environments, vision can often be obscured, for example by smoke. This vision impairment may make firefighter operations difficult (e.g. since the firefighters may have difficulty seeing to locate the fire and/or persons in need of assistance and/or other firefighter/responder personnel), and may even make it difficult for the firefighter to use various equipment/devices that may be carried or used by the firefighter (e.g. due to the screens or controls of the devices being obscured by smoke, for example).

SUMMARY

In an embodiment, a face mask embodiment might comprise a breathable air system configured to provide breathable air to a user; an eyepiece configured to protect the user's eyes and face; a camera located on a portion of the face mask configured to capture data proximate to the user; a near-eye display located on the interior of the eyepiece configured to display information to the user near to the user's face; and an electronics module attached to the eyepiece configured to power and control the near-eye display, receive information from one or more devices, and display the received information via the near-eye display In an embodiment, a near-eye display (e.g. for use with a face mask) might comprise a display located on the interior of the face mask and configured to provide information to the user; and an electronics module configured to receive information, and display the received information via the display, wherein the electronics module comprises a wireless communication module.

In an embodiment, a method (e.g. for displaying information to a user wearing a face mask) might comprise receiving information from one or more devices carried by or located near the user; displaying the received information via a near-eye display located on the interior of the face mask; and switching between a plurality of displays of the near-eye display based on input from the user.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 3A-3C illustrate exemplary gesture based controls for use with a respirator mask comprising a near-eye display according to an embodiment of the disclosure.

DETAILED DESCRIPTION

Figure 1:
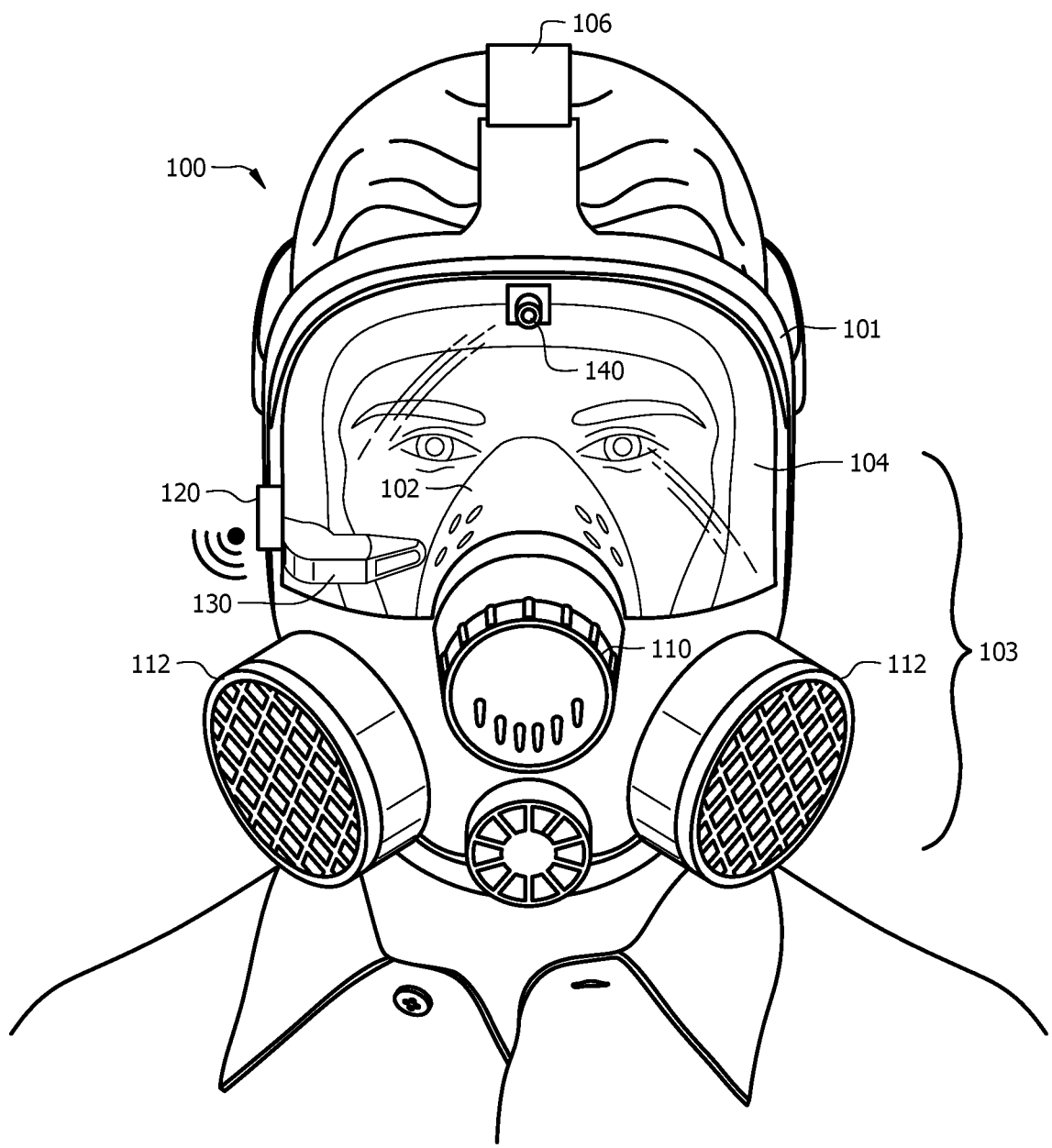
FIG. 1 illustrates a front view of a respirator mask comprising a near-eye display according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for providing improved vision for first responders when working in a hazardous environment. For protection when working in a hazardous environment, firefighters may wear/carry a self-contained breathing apparatus (SCBA) which may also include a Personal Alert Safety System (PASS) to indicate certain characteristics or conditions of the environment, the user, and/or the equipment carried by the user. It may be important for a user to be able to see the status information communicated by the PASS, but when working in a hazardous environment, such as fighting a fire, smoke can quickly reduce the vision of the user, essentially "blinding" firefighting and handicapping their ability to perform effectively, find the seat of the fire and/or locate victims.

To help with locating certain parts of a fire while having limited vision, a firefighter may use hand-held thermal imaging cameras (TICs) to supplement their vision through the smoke-filled environment. Additionally a firefighter may wear a heads-up display (HUD) configured to provide information such as equipment status, environmental characteristics, as well as audible, visible alerts to understand the status of PASS.

To operate the PASS, TICs, and/or HUD, a user may be required to provide physical feedback or actions, such as holding the TIC, pressing one or more buttons. However, physical interaction with this equipment may be difficult depending on the protective equipment worn by the user, and environmental factors. Typically, there are no hands-free operation options for using the PASS, TICs, and/or HUD. Some TICs may be available for firefighting use in helmet-mounted units, where the display is located outside the helmet, but a smoke-filled environment may block or obscure the view to the display (making use/operation more difficult or impossible). Typically, TICs may not be configured to connect to PASSs, and therefore the TIC data may not be included in the information communicated to the user via a HUD, such as the status or health of the PASS.

Embodiments of the disclosure provide a hands-free solution for providing enhanced vision to a user, including information about the surrounding environment, by integrating a digital heads-up near-eye display into the face mask of an SCBA. The near-eye display may be connected with other devices carried/worn by the user, and may be able to provide information to the user regardless of impaired visibility due to the environment (e.g. since the display is located within the mask, for example via a near-eye display). Additionally, the near-eye display may be configured to receive and display information from a TIC mounted on the face mask.

To allow for hands-free operation of the near-eye display and/or equipment/devices in communication with and/or controlled by the near-eye display system (e.g. devices/equipment whose information is to be displayed by the near-eye display), a camera (e.g. the system with a camera) (which may be the TIC) may be configured with gesture sensing, where the gestures may control a graphical display of the near-eye display. The graphical display may include current system status or health such as cylinder pressure, battery status, system faults, and/or other diagnostics, as well as user biometrics, environmental characteristics, and any other information that may be communicated to the near-eye display from one or more device(s) carried or worn by the user. The near-eye display and gesture sensing may allow for two-way communication with a PASS system, where the gestures may indicate and cause the display to shift between modes. Gesture sensing may be preferred over other hands-free options, as voice recognition and communication may be difficult while wearing the face mask. The near-eye display may comprise a wireless or wired connection with the SCBA, PASS, TIC, or any other device/equipment carried or worn by the user. Additionally, the near-eye display may wirelessly communicate with devices within the environment (e.g. devices not worn by the user, but typically in proximity to the user (e.g. in the same environmental area)), such as local detector devices, drone devices, etc. In some embodiments, the near-eye display may be used with only one of the described devices, such as the thermal imaging system without connecting to the PASS.

The near-eye display may fit inside a typical face mask or helmet (e.g. of a SCBA system) to provide an uninterrupted communication to the user. The near-eye display may be battery operated and configured to attach to a portion of the face mask. The near-eye display may be adjustable by a user to improve comfort and visibility.

Referring now to FIG. 1, an exemplary embodiment of a respirator mask 100 is shown. The mask 100 may comprise a breathable air system 103 which may comprise seals, filters, valves, hoses, and/or an air supply. In some embodiments, the breathable air system may comprise an oral/nasal cup 102 operable to cover the nose and mouth of a user. The cup 102 may attach to one or more cartridges 112, wherein the cartridges 112 may be attached to inhalation valves (not shown) on the cup 102. The cartridges 112 may filter the air breathed by the user. The cup 102 may also comprise and exhalation valve 110, wherein the user's exhaled breath may be expelled through the exhalation valve 110. The cup 102 may seal against a user's face to ensure that user is breathing through the cup 102. In other embodiments, the cup 102 may not seal against the user's face, but may only direct the user's breathing.

In some embodiments, the mask 100 may comprise an eyepiece 104 (which may also be called a facepiece or face mask) operable to protect the user's eyes and/or face. In some embodiments the eyepiece 104 and/or oral/nasal cup 102 may be attached to a frame 101, wherein the frame 101 may be held against the user's face by one or more head straps 106. In some embodiments, the frame 101 may seal against the user's face, preventing air from entering the interior of the mask 100. This may allow the user to breathe only through the inhalation valve(s) and exhalation valve 110, and therefore the user may also breathe filtered air that passes through the cartridges 112.

In some embodiments, the mask 100 may comprise an electronics module 120 attached to the mask 100. In the embodiment shown, the module 120 may be attached to the eyepiece 104 of the mask 100. The mask 100 may also comprise a near-eye display 130 located on the interior of the eyepiece 104. The electronics module 120 may be located on the interior of the eyepiece 104 (or mask) or the exterior of the eyepiece 104 (or mask). The electronics module 120 may be connected (e.g. electrically, wired, wirelessly, and/or communicatively) to the near-eye display 130 to provide communication and/or power to the near-eye display 130.

The mask 100 may also comprise a camera 140, which may comprise an infrared (IR) camera, or thermal imaging camera (TIC). The camera 140 may be configured to provide information to the near-eye display 130 via a wired or wireless connection (e.g. communicatively coupled to the near-eye display 130). The electronics module 120 may comprise a wireless communication module configured to provide communication between the near-eye display 130 and other devices, such as the camera 140 (e.g. such that the communicative coupling between the camera 140 and the near-eye display 130 may be through the electronics module 120), or any other device carried or worn by the user. In some embodiments, the camera 140 may be equipped with gesture sensing, wherein the sensed gestures may control the display of the near-eye display 130 (for example, allowing the user to switch/scroll between different devices/equipment using gestures (e.g. a first gesture) and/or to select one of the several devices/equipment for display (e.g. display of that selected device's information) on the near-eye display using gestures (for example using a second gesture). In some embodiments, the camera 140 (e.g. TIC), electronics module 120, and near-eye display 130 may work together for gesture control (e.g. as part of a system). For example, the camera 140 may detect user hand motion, the electronics module 120 may analyze the data from the camera 140 to determine if detected hand motion/gestures match a pre-defined gesture indicative of a pre-set control, and the near-eye display 130 may operate in accordance with the control (e.g. when a match occurs/is detected).

Figure 2A:
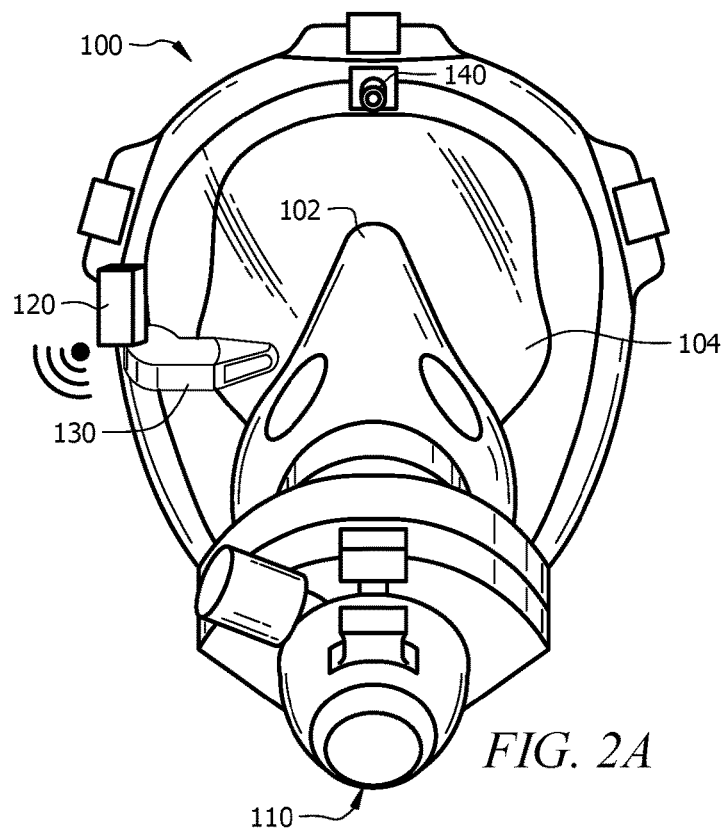
FIG. 2A illustrates another front view of a respirator mask comprising a near-eye display according to an embodiment of the disclosure.
Figure 2B:
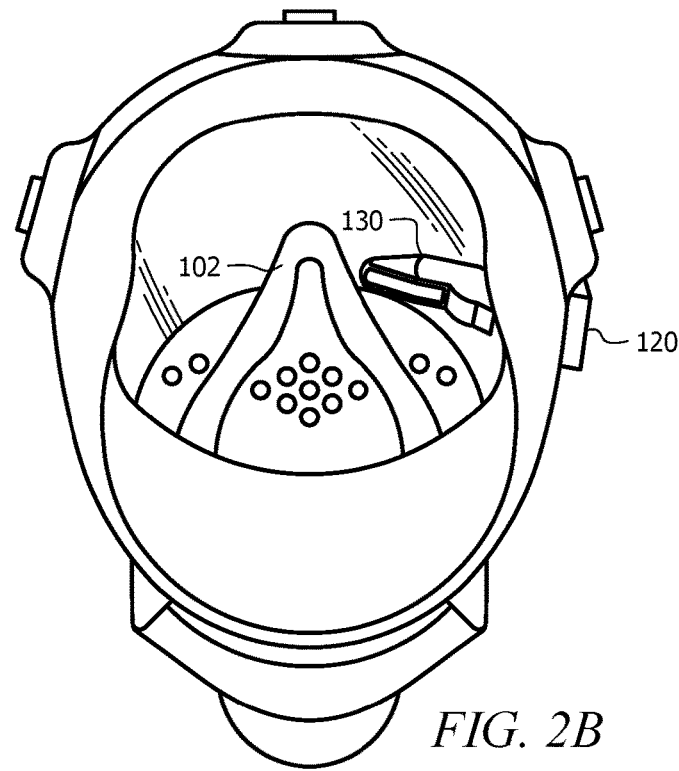
FIG. 2B illustrates an interior view of a respirator mask comprising a near-eye display according to an embodiment of the disclosure.

FIGS. 2A-2B illustrate additional views of an exemplary face mask 100 comprising the camera 140, electronics module 120, and near-eye display 130. FIG. 2A illustrates a front view of the mask 100 and FIG. 2B illustrates a back/interior view of the mask 100. In some embodiments, the mask 100 may be connected to a hose or other air supply, and the mask 100 may comprise an exhalation valve 110.

FIGS. 3A-3C illustrate examples of a gesture controlled display for a near-eye display 130 (as shown above). The gesture controlled display 300 may comprise a plurality of "displays" which may also be called screens or menus. The displays may include, but are not limited to, temperature 302, gas sensor readings 304, drone vision camera 306, vitals (or user biometrics) 308, thermal vision 310 (which may be provided by a TIC), heads-up display 312 (which may comprise information from a PASS), and/or navigation 314 (for example, for selecting and displaying information from various devices that might be in communication with the system). The displays described herein are examples only, where other information (e.g. additional and/or alternative information) may be included in the displays that are available to the near-eye display. In some embodiments, the electronics module may be configured to receive gesture information from the camera and control the display of the near-eye display accordingly.

FIGS. 3B and 3C illustrate examples of gestures that may be used to control the near-eye display. Movement of a user's hand in front of the camera may indicate different actions. For example, movement back and forth, such as a wave or swipe 320, may indicate that the user wishes to move between displays (e.g. moving between displays associated with different devices, as in FIG. 3A). As another example, a thumbs-up 322 movement may indicate that the user wishes to select the current option (e.g. after moving between displays, as in FIG. 3A, to select a particular device from a plurality of devices). Additionally, other movements of a user's hand may be correlated to actions on the near-eye display. Thus, a user might wave/swipe their hand (e.g. within a certain range or positions or window of space) to move or rotate between the available displays (e.g. with each display associated with a particular device from a plurality of devices communicatively coupled to the system and/or available to provide information for display in the system), and might give a thumbs-up hand gesture (e.g. within the window of space) to select the current or active display. Then, the near-eye display might display the information associated with and/or received from the corresponding device associated with the selected display.

Some embodiments may further comprise a method (which for example might be executed/performed by a face mask system of the sort described herein) comprising one or more of the following steps: detecting, by a camera (e.g. a thermal imaging camera) hand motion/gestures of a user/wearer of the mask (e.g. wherein the TIC/camera is configured to detect hand motion/gestures of the user/wearer (e.g. within a prescribed widow of space in front of the user)); transmitting image/motion/gesture data from the camera (e.g. TIC) to an electronics module (which typically includes a processor configured to evaluate such data and to communicate with the TIC); evaluating, by the electronics module (e.g. in communication with the TIC), the image/motion/gesture data to determine if one or more pre-determined control motions/gestures are detected (e.g. by comparing to pre-set control image/motion/gesture standards); responsive to determining that the image/motion/gesture data corresponds to a control image/motion/gesture standard, transmitting, by the electronics module, display image information based on the detected control data to a near-eye display; displaying, by the near-eye display (e.g. within the mask), the display image information, wherein the control image/motion/gesture standards comprise at least two different image/motion/gesture standards (e.g. corresponding to (a) switching/scrolling between displays (which might each be related to different devices/equipment from which data could be received and displayed) and (b) selecting a display (e.g. associated with one of the different devices)—e.g. with a hand wave/swipe and thumbs-up); and scrolling/switching between displays by the electronics module and near-eye display (e.g. associated with various devices/equipment and operable or configured to communicate with the system) based on a first pre-set hand motion/gesture and selecting based on a second pre-set hand motion/gesture.

In some embodiments, a method may comprise communicatively coupling a plurality of devices to the electronics module (e.g. wirelessly) so that the electronics module may receive information/data from each (e.g. selectively (for example on different channels)) or every (e.g. simultaneously (for example using a single channel)) of the devices (so that in some embodiments, the electronics module decides which device to receive from (e.g. switching to the channel associated with that device) and then transmits that information to the display, and in other embodiments the electronics module might constantly receive information from all (or at least a plurality of) devices (which might all transmit on a single channel) and then decide internally which information to send to the display); providing a display associated with each device for scrolling purposes; providing a display associated with a selected device for display of actual received data/information from the selected device. In some embodiments, the system further comprises a PASS configured to communicate with a plurality of devices and the electronics module communicates with one or more of the devices through the PASS. In some embodiments, one of the devices is a drone configured to transmit (e.g. to the electronics module) image data (e.g. thermal images) from a perspective/vantage point/angle different from the user/TIC. In some embodiments, the method further comprises attaching the TIC, electronics module, and near-eye display to a pre-existing SCBA mask (e.g. mounting the TIC and the electronics module on the mask and mounting the near-eye display within the mask (e.g. on the interior of the face mask/eyepiece)); transmitting data from the electronics module to one or more of the devices, wherein the electronics module comprises a wireless receiver/transceiver; and/or using thermal imaging (e.g. TIC) to detect user hand motions/gestures (e.g. within a smoke environment, so the control mechanism will be unaffected by smoke).

Having described various devices and methods herein, exemplary embodiments or aspects can include, but are not limited to:

In a first embodiment, a face mask may comprise a breathable air system configured to provide breathable air to a user; an eyepiece configured to protect the user's eyes and face; a camera located on a portion of the face mask; a near-eye display located on the interior of the eyepiece; and an electronics module attached to the eyepiece configured to power and control the near-eye display, receive information from one or more devices, and display the received information via the near-eye display.

A second embodiment can include the face mask of the first embodiment, wherein the near-eye display is configured to be adjustable by a user.

A third embodiment can include the face mask of the first or second embodiments, wherein the camera comprises a thermal imaging camera.

A fourth embodiment can include the face mask of any of the first to third embodiments, wherein the camera comprises an infrared camera.

A fifth embodiment can include the face mask of any of the first to fourth embodiments, wherein the camera is configured to detect gesture controls from the user, and communicate the gesture controls to the electronics module.

A sixth embodiment can include the face mask of any of the first to fifth embodiments, wherein the electronics module is configured to receive gesture control information from the camera, and control the display based on the received gesture control information.

A seventh embodiment can include face mask of any of the first to sixth embodiments, wherein the electronics module is configured to receive information from a self-contained breathing apparatus, a personal alert safety system, a thermal imaging camera, a biometrics monitor, a gas detector, one or more environmental sensors, a navigation system, a drone-based camera system, and other similar devices.

An eighth embodiment can include the face mask of any of the first to seventh embodiments, wherein the breathable air system comprises one or more of the following: a filter, a powered-air purifying system, a cylinder and/or other container.

A ninth embodiment can include the face mask of any of the first to eighth embodiments, wherein the electronics module is configured to receive video data from the one or more devices, and display the video data via the near-eye display.

In a tenth embodiment, a near-eye display for use with a face mask may comprise a display located on the interior of the face mask and configured to provide information to the user; and an electronics module configured to receive information, and display the received information via the display, wherein the electronics module comprises a wireless communication module.

An eleventh embodiment can include the near-eye display of the tenth embodiment, wherein the electronics module is configured to receive gesture control information from a camera, and control the display based on the received gesture control information.

A twelfth embodiment can include the near-eye display of the tenth or eleventh embodiments, wherein the electronics module is configured to receive information from a self-contained breathing apparatus, a personal alert safety system, a thermal imaging camera, a biometrics monitor, a gas detector, one or more environmental sensors, a navigation system, a drone-based camera system, and other similar devices.

A thirteenth embodiment can include the near-eye display of any of the tenth to twelfth embodiments, wherein the near-eye display is configured to be adjustable by a user.

A fourteenth embodiment can include the near-eye display of any of the tenth to thirteenth embodiments, wherein the electronics module is configured to receive video data from the one or more devices, and displaying the video data via the near-eye display.

In a fifteenth embodiment, a method for displaying information to a user wearing a face mask may comprise receiving information from one or more devices carried by or located near the user; displaying the received information via a near-eye display located on the interior of the face mask; and switching between a plurality of displays of the near-eye display based on input from the user.

A sixteenth embodiment can include the method of the fifteenth embodiment, wherein receiving information comprises wirelessly receiving information from one or more devices.

A seventeenth embodiment can include the method of the fifteenth or sixteenth embodiments, further comprising receiving gesture controls from a camera located on the face mask, and controlling the near-eye display based on the received gesture controls.

An eighteenth embodiment can include the method of any of the fifteenth to seventeenth embodiments, wherein the one or more devices comprise a self-contained breathing apparatus, a personal alert safety system, a thermal imaging camera, a biometrics monitor, a gas detector, one or more environmental sensors, a navigation system, a drone-based camera system, and other similar devices.

A nineteenth embodiment can include the method of any of the fifteenth to eighteenth embodiments, further comprising providing breathable air to a user via the face mask.

A twentieth embodiment can include the method of any of the fifteenth to nineteenth embodiments, further comprising receiving video data from the one or more devices, and displaying the video data via the near-eye display.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure.

Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A face mask comprising:
   a breathable air system configured to provide breathable air to a user;
   an eyepiece configured to protect the user's eyes and face;
   a camera located on a portion of the face mask configured to capture data proximate to the user;
   a user-adjustable near-eye display located on the interior of the eyepiece configured to display information to the user near the user's face, wherein user-adjustable comprises positioning the user-adjustable near-eye display to provide the user with an unobstructed view through the eyepiece; and
   an electronics module attached to the eyepiece configured to:
   power and control the user-adjustable near-eye display,
   receive information from one or more devices and display the received information via the user-adjustable near-eye display.

2. The face mask of claim 1, wherein the camera comprises a thermal imaging camera.

3. The face mask of claim 1, wherein the camera comprises an infrared camera.

4. The face mask of claim 1, wherein the camera is configured to detect gesture controls from the user, and communicate the gesture controls to the electronics module.

5. The face mask of claim 4, wherein the electronics module is configured to receive gesture control information from the camera, and control the user-adjustable near-eye display based on the received gesture control information.

6. The face mask of claim 1, wherein the electronics module is configured to receive information from a self-contained breathing apparatus, a personal alert safety system, a thermal imaging camera, a biometrics monitor, a gas detector, one or more environmental sensors, a navigation system, a drone-based camera system, and other similar devices.

7. The face mask of claim 1, wherein the breathable air system comprises one or more of the following: a filter, a powered-air purifying system, and a cylinder.

8. The face mask of claim 1, wherein the electronics module is configured to receive video data from the one or more devices, and display the video data via the user-adjustable near-eye display.

9. A near-eye display system for use with a face mask, the near-eye display system comprising:
   a user-adjustable display located on the interior of the face mask and configured to provide information to a user, wherein user-adjustable comprises positioning the display to provide the user with an unobstructed view through the face mask; and
   an electronics module configured to:
   receive information, and
   display the received information via the user-adjustable display, wherein the electronics module comprises a wireless communication module.

10. The near-eye display system of claim 9, wherein the electronics module is configured to receive gesture control information from a camera, and control the user-adjustable display based on the received gesture control information.

11. The near-eye display system of claim 9, wherein the electronics module is configured to receive information from a self-contained breathing apparatus, a personal alert safety system, a thermal imaging camera, a biometrics monitor, a gas detector, one or more environmental sensors, a navigation system, a drone-based camera system, and other similar devices.

12. The near-eye display system of claim 9, wherein the electronics module is configured to receive video data from one or more devices carried by or located near the user, and display the video data via the user-adjustable display.

13. A method for displaying information to a user wearing a face mask, the method comprising:
   receiving information from one or more devices carried by or located near the user;
   displaying the received information via a user-adjustable near-eye display located on the interior of the face mask, wherein user-adjustable comprises positioning the user-adjustable display to provide the user with an unobstructed view through the face mask; and
   switching between a plurality of displays of the user-adjustable near-eye display based on input from the user.

14. The method of claim 13, wherein receiving information comprises wirelessly receiving information from one or more devices.

15. The method of claim 13, further comprising receiving gesture controls from a camera located on the face mask, and controlling the user-adjustable near-eye display based on the received gesture controls.

16. The method of claim 13, wherein the one or more devices comprise a self-contained breathing apparatus, a personal alert safety system, a thermal imaging camera, a biometrics monitor, a gas detector, one or more environmental sensors, a navigation system, a drone-based camera system, and other similar devices.

17. The method of claim 13, further comprising providing breathable air to the user via the face mask.

18. The method of claim 13, further comprising receiving video data from the one or more devices, and displaying the video data via the user-adjustable near-eye display.

* * * * *